United States Patent
Baalu et al.

(10) Patent No.: US 10,231,074 B2
(45) Date of Patent: *Mar. 12, 2019

(54) CLOUD HOSTED AUDIO RENDERING BASED UPON DEVICE AND ENVIRONMENT PROFILES

(71) Applicant: Harman International Industries, Incorporated, Northridge, CA (US)

(72) Inventors: Arvin Baalu, Bangalore (IN); Anantha Krishnan B S, Bangalore (IN); Joy Lejin, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/423,179

(22) Filed: Feb. 2, 2017

(65) Prior Publication Data

US 2017/0150289 A1 May 25, 2017

Related U.S. Application Data

(63) Continuation of application No. 14/502,091, filed on Sep. 30, 2014, now Pat. No. 9,582,576, which is a continuation of application No. 13/345,731, filed on Jan. 8, 2012, now Pat. No. 8,856,272.

(51) Int. Cl.
| | |
|---|---|
| *H04S 7/00* | (2006.01) |
| *G06F 17/30* | (2006.01) |
| *H04L 29/06* | (2006.01) |
| *H04L 29/08* | (2006.01) |
| *H04L 12/911* | (2013.01) |

(52) U.S. Cl.
CPC .......... *H04S 7/307* (2013.01); *G06F 17/3074* (2013.01); *G06F 17/30752* (2013.01); *H04L 47/70* (2013.01); *H04L 65/60* (2013.01); *H04L 67/10* (2013.01); *H04S 7/30* (2013.01); *H04L 67/30* (2013.01); *H04S 7/305* (2013.01)

(58) Field of Classification Search
CPC ..... H04S 7/307; H04L 65/60; G06F 17/30752
See application file for complete search history.

(56) References Cited

U.S. PATENT DOCUMENTS

| | | |
|---|---|---|
| 7,487,209 B2 | 2/2009 | Bodin et al. |
| 7,689,705 B1 | 3/2010 | Lester et al. |
| 2007/0168191 A1 | 7/2007 | Bodin et al. |
| | (Continued) | |

FOREIGN PATENT DOCUMENTS

WO 2011020065 A1 2/2011

OTHER PUBLICATIONS

European Search Report for corresponding Application No. 13150444.1, dated Apr. 23, 2013, 6 pages.

(Continued)

*Primary Examiner* — El Hadji M Sall
(74) *Attorney, Agent, or Firm* — Brooks Kushman P.C.

(57) ABSTRACT

Systems and method for requesting audio content that is stored in a cloud network and accessed by many different audio devices where each of the audio devices may have an optimal type of audio encoding, format, and characteristic in addition to being located in different types of listening environment that are considered by a cloud audio server when preparing audio content for transmission to a requesting audio device.

11 Claims, 10 Drawing Sheets

(56) References Cited

U.S. PATENT DOCUMENTS

| | | |
|---|---|---|
| 2008/0098090 A1 | 4/2008 | Geraci et al. |
| 2008/0293356 A1 | 11/2008 | Kummernuss |
| 2009/0048848 A1* | 2/2009 | Krig .................... G10L 19/167 704/500 |
| 2009/0319647 A1 | 12/2009 | White et al. |
| 2010/0169410 A1 | 7/2010 | Lund et al. |
| 2010/0235542 A1 | 9/2010 | Visharam et al. |
| 2010/0250773 A1 | 9/2010 | Mao |
| 2012/0240045 A1* | 9/2012 | Bradley ................ G10L 13/04 715/716 |

OTHER PUBLICATIONS

Non-Final Office Action for corresponding U.S. Appl. No. 13/345,731, dated Jul. 31, 2013, 6 pages.
Non-Final Office Action for corresponding U.S. Appl. No. 13/345,731, dated Jan. 30, 2014, 7 pages.
European Office Action for corresponding Application No. 13 150 444.1, dated Nov. 22, 2016, 6 pages.
Non-Final Office Action for corresponding U.S. Appl. No. 14/502,091, dated Jul. 17, 2015, 7 pages.
Final Office Action for corresponding U.S. Appl. No. 14/502,091, dated Jan. 15, 2016, 9 pages.

* cited by examiner

| Device Attribute(Characteristic) 702 | System Usage & Impact |
|---|---|
| Number of audio Channels 704 | This is the number of audible channels or the number of speakers available on the device. May determine the perception of sound. |
| Preferred audio encoding 706 | Device's preferred encoding. |
| Bandwidth Available 708 | Network bandwidth available for connecting to a server |
| Internal Memory 710 | Identifies if the audio device is capable of "caching/buffering" the audio date. |
| Equipment identifier 712 | An identifier associated with the type of audio device. |
| Device Identifier 714 | An identifier that is unique to the audio device. |

FIG. 7

| Environment Attribute (characteristic) 802 | System Usage & Impact |
|---|---|
| Operating environment 804 | Large Hall, Concert Hall, Stadium, Car, On the move (portable device) etc... |
| Unique operating environment 806 | Operating parameters for unique locations that have been previously determined. |
| Noise Profile 808 | Noise characteristics of the operating environment used by system to tailor audio data to cancel the effects of noised. |

FIG. 8

CLOUD HOSTED AUDIO RENDERING BASED UPON DEVICE AND ENVIRONMENT PROFILES

CROSS-REFERENCE TO RELATED APPLICATIONS

This application is a continuation of U.S. application Ser. No. 14/502,091 filed Sep. 30, 2014 which is now U.S. Pat. No. 9,582,576, which is a continuation of U.S. application Ser. No. 13/345,731 filed Jan. 8, 2012 which is now U.S. Pat. No. 8,856,272, the disclosures of which are hereby incorporated in their entirety by reference herein.

TECHNICAL FIELD

This application relates to the field of audio systems. More specifically, the application relates to systems for modifying, delivering and rendering audio signals based on device-specific or environment-specific profiles.

BACKGROUND

It is known to provide signal processing or media alterations on remote devices. For example, some applications for desktop or laptop computers, such as HEAR, provide for modified audio output, such as sound equalization and adjustment of treble, bass, but such known approaches modify the audio content as it is being processed or played by the media player. In other known approaches, clients may request audio content of a predetermined bit-rate from a server that then dynamically transcodes the audio content for the client. But all of the known approaches either require the processing on the media player or transcoding of the audio content for a different digital audio format (such as MP3 or WAV). The underlying audio content is not processed in these approaches; rather it is simply the format or quality of the audio content that is changed. No modification of the audio content at the server occurs in response to the type of playing device and listening environment.

Thus, there is a need in the art for improvements that address the aforementioned problems and facilitate the underlying audio content at a server based upon playing device and listening environment. The aforementioned shortcomings and others are addressed by systems and related methods according to aspects of the invention.

SUMMARY

In view of the above, systems and methods are provided for requesting audio content from an audio device from a cloud access server (CAS) that resides in a cloud network. The CAS receives the request and identifies a device profile and environment profile associated with the requesting audio device. Based upon attributes found in the device profile and environment profile, the CAS causes the requested original audio content to be processed for the requesting audio device. Such processing may include changing the encoding from 5.1 surround sound audio to two channel audio. The file format encoding may also be transcended from PCM audio data to an MP3 format. The processed audio file that is now optimized for playing on the audio device is then sent or streamed to the requesting audio device.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The description below may be better understood by referring to the following figures. The components in the figures are not necessarily to scale, emphasis instead being placed upon illustrating the principles of the invention. In the figures, like reference numerals designate corresponding parts throughout the different views.

FIG. 7 is one example of a table of characteristics that may be contained in a device profile received at the CAS of FIG. 5 from a PMP of FIG. 1 or AVR of FIG. 3.

FIG. 8 is one example of a table of characteristics of environment attributes that may be received at CAS of FIG. 5.

DETAILED DESCRIPTION

Cloud computing has brought a paradigm shift to the way in which information is hosted, processed, and exchanged, where cloud computing is defined as the delivery of computing as a service rather than a product, whereby shared resources, software and information are provided to computers and other devices as a utility (like the electricity grid) over a network (typically the Internet). Accessibility, scalability, and reliability advantages of cloud computing has resulted in new types of processing and seemingly infinite storage capacity. One technology that may benefit from this paradigm shift is the delivery of audio content. Audio content can now be stored in the network cloud and accessed by many different audio devices. Each of these devices may have an optimal type of audio encoding, format, and characteristics. Further, the type of listening environment may also be considered by a cloud audio server when preparing audio content for transmission to a remote or client audio device.

Figure 1:
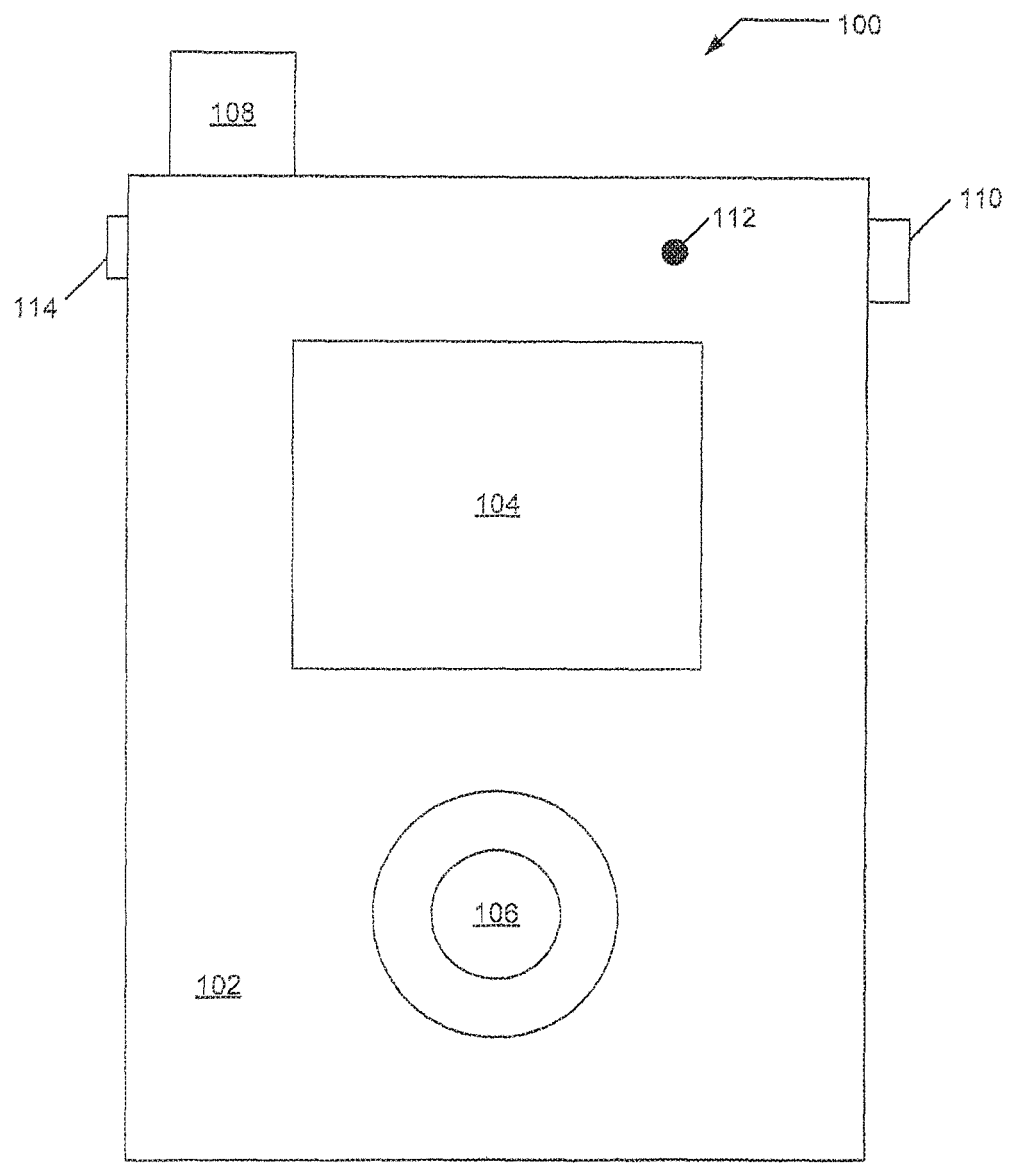
FIG. 1 is an illustration a portable media player (PMP) in accordance with one example of an implementation of the invention.

FIG. 1 is an illustration 100 a portable media player (PMP) 102 in accordance with one example of an implementation of the invention. The PMP 102 may have a display 104, controls 106, wireless internet antenna 108, earphone jack 110, and microphone 112. The PMP may access the internet using the wireless internet antenna 108 to connect with a wireless 802.3b/g or n internet access point or router. The display 104 along with control 106 may be used to traverse graphical menus to set up and use the PMP. The display 104 may also be used to provide feedback regarding the current audio content that is being played by the PMP 102. An earphone jack 110 may be present for connecting external speakers or earphones to the PMP 102. A microphone 112 or microphone jack may be built into the PMP 102 for recording audio sounds. Additionally, a universal serial bus (USB) port 114 may also be present in the PMP 102 in order for the PMP 102 to be connected to a computing device, such as a personal computer. Examples of PMP 102 may include APPLE's IPAD, TRIO 4300HD, and SANSA E200 personal media players. Cellular smart phones, such as APPLE's IPHONE and HTC DROID phones may also function as media players. PMP typically plays MP3 or WMA (APPLE products ITUNES) encoded two channel audio signals.

Figure 2:
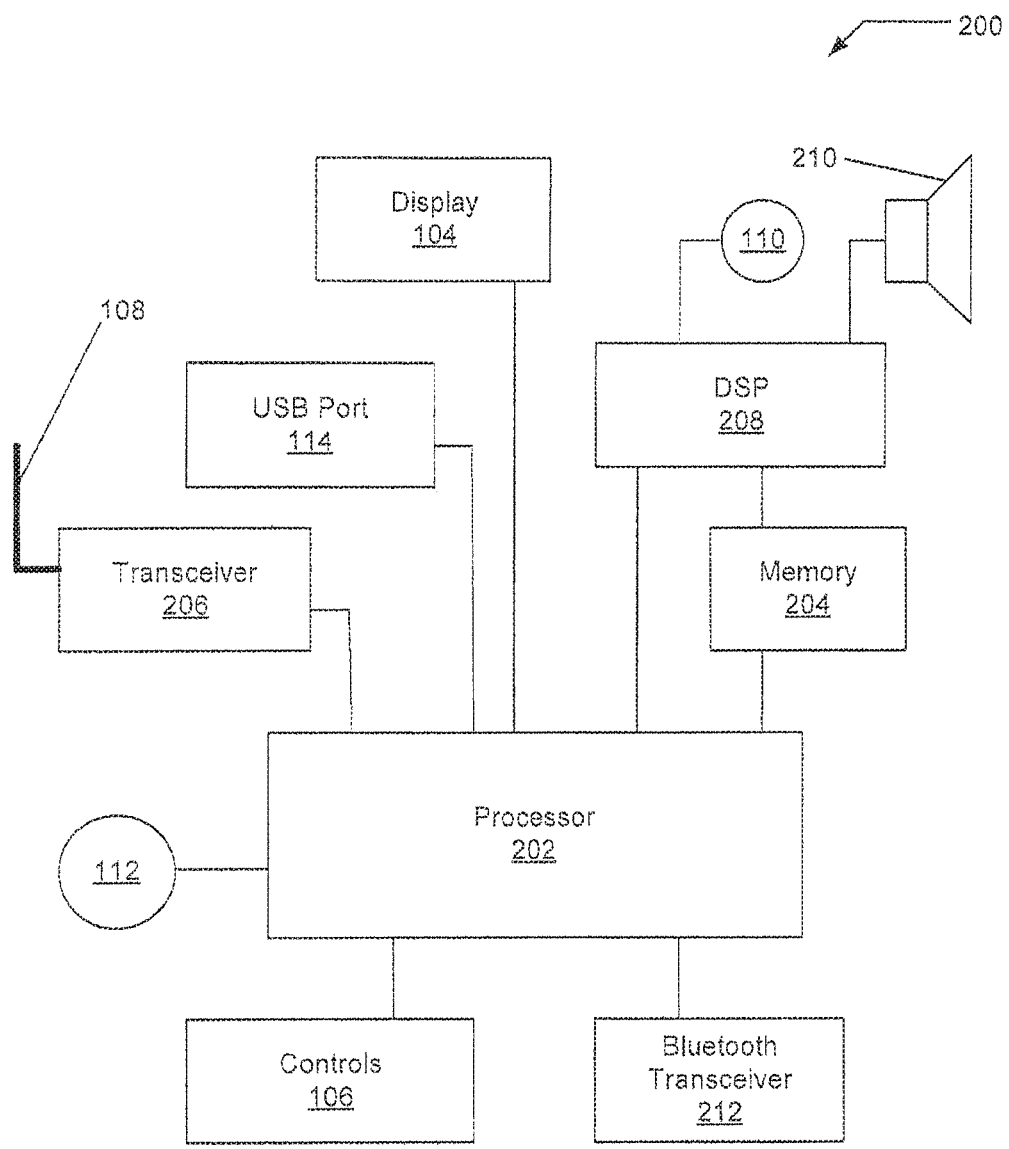
FIG. 2 is a block diagram of one example of an implementation of the PMP of FIG. 1.

Turning to FIG. 2, FIG. 2 is a block diagram 200 of one example of an implementation of the PMP 102 of FIG. 1. A processor 202 or other controller may be connected to the display 104, controls 106, memory 204, microphone 112, Wi-Fi transceiver 206 coupled to antenna 108, USB port 114, digital signal processor (DSP) 208 that may also be coupled with memory 204. DSP 208 may also be connected to a speaker 210 and headphone jack 110. The processor 202 may optionally have a Bluetooth transceiver 212 for communicating with Bluetooth enabled devices, such as speakers, headsets, and receivers (car AVR and home AVR).

The DSP 208 is able to access the audio content (i.e. audio data stream or audio data in memory) and generate audio signals from the audio content. In the current example implementation, the processor 202 and DSP 208 are shown as being separate, but in other implementations the processor 202 and DSP 208 may be combined into a single processor or a single DSP. The memory 204 is depicted as a single memory, but in practice the memory may be divided between different types of memory located in more than one location within the PMP 102. Examples of such memory may be removable SD random access memory (RAM), RAM located within the DSP, RAM located within the processor, display buffers associated with display 104.

Audio content may be downloaded to the PMP 102 via antenna 108 by transceiver 206 and stored in memory 204 for access by the DSP 208 when audio signals are desired from the audio content. The PMP 102 may access cloud implemented servers to receive the audio content. In some implementations, the audio content that is accessed may be streaming audio content. The streaming content is received via transceiver 206 and routed to the DSP 208 for generation of audio signals that may be heard at speaker 210 made available at headphone jack 110.

Figure 3:
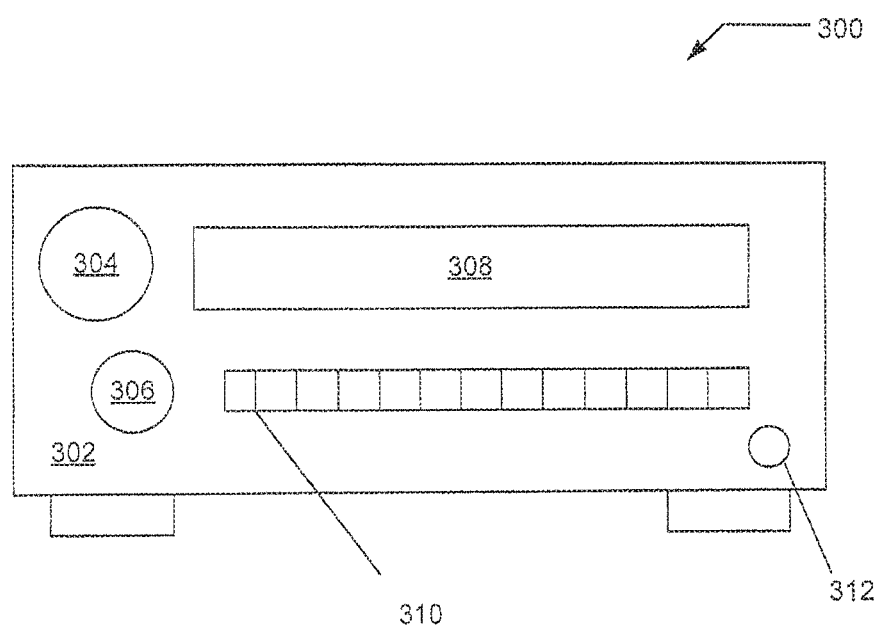
FIG. 3 is an illustration of an Audio Video Receiver (AVR) in accordance with one example of an implementation of the invention.

FIG. 3 is an illustration 300 of an Audio Video Receiver (AVR) 302 in accordance with one example of an implementation of the invention. The AVR 302 may have a volume control 304, a selector 306, display 308, buttons 310, and microphone jack 312. The AVR 302 may accept audio input via wired internet, wireless internet, Bluetooth, USB storage devices, multiple two or more channel audio signal inputs (i.e. AUX, CD, TAPE, DVD, PMP), and multiple video inputs (i.e. composite, component, and HDMI). The AVR 302 may also have connections for antennas and pre-amplifiers. The AVR 302 may also have audio signal outputs for multiple speakers; such 5.1 and 7.1 surround sound speaker systems. AVR 302 generally supports a range of channels (2.1, 2.2 5.1 and 7.1) with each channel being connected to a speaker. Unlike PMP 102, the AVR 302 is capable of processing Dolby Surround formatted audio signals and data.

AVR 302 is typically found in a consumer household setting and is capable of determining the characteristics of a listening room using known approaches. These approaches make use of predetermined audio sounds that are generated by the AVR 302 and played through the speakers connected to the AVR 302. A microphone connected to microphone jack 312 receives the audio signals played through the speakers. The AVR 302 then processes the AVR to determine the optimal filters to apply to the audio signal for the listening room where the AVR 302 resides.

Figure 4:
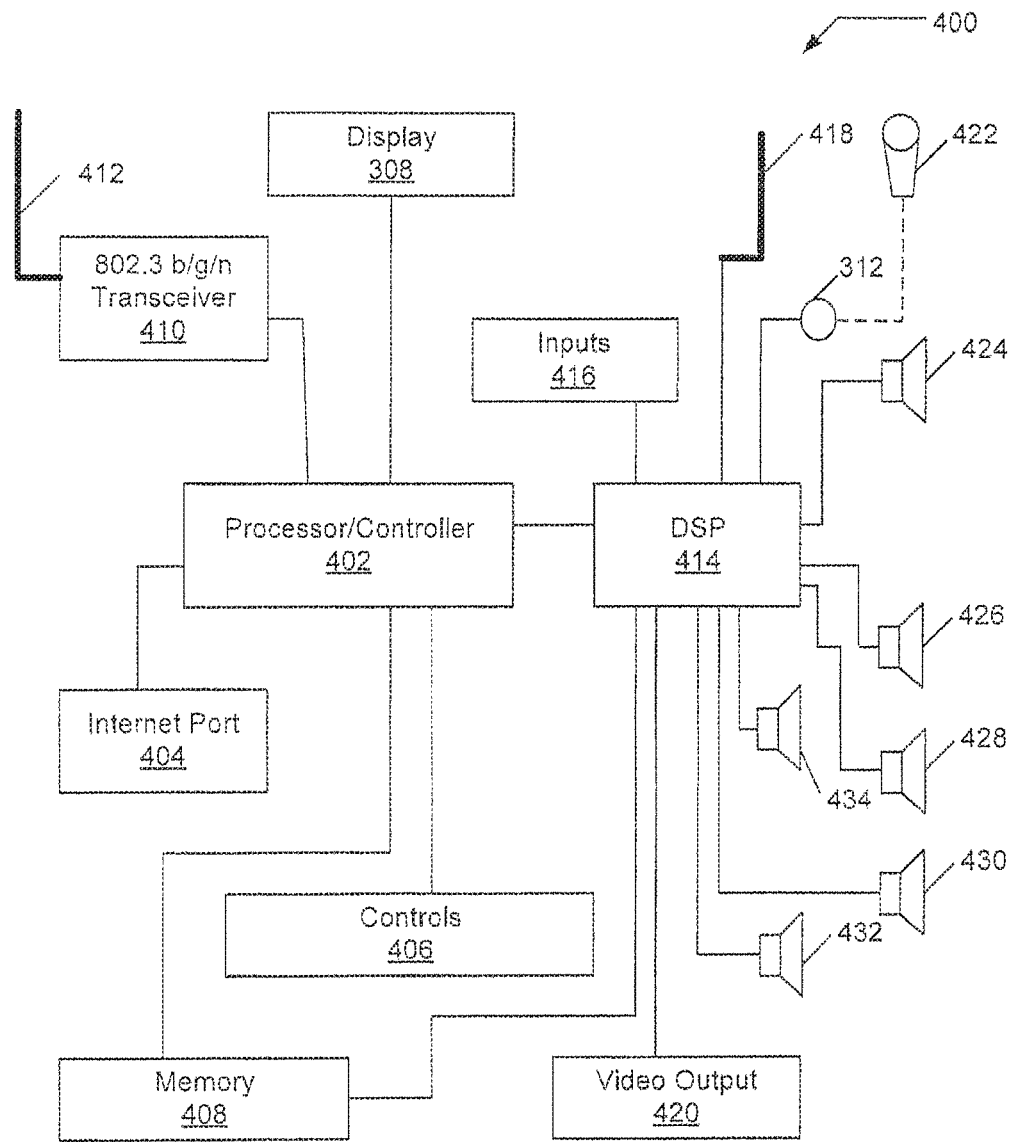
FIG. 4 is a block diagram of one example of an implementation of the AVR of FIG.

Turning to FIG. 4, FIG. 4 is a block diagram 400 of one example of an implementation of the AVR 302 of FIG. 3. A processor 402 is coupled to a display 308, internet port 404, controls 406 (304, 306 and 310 of FIG. 3), memory 408, an 802.3b/g/n transceiver 410 that is coupled to an antenna 412, and DSP 414. DSP 414 may be coupled to memory 408, audio video inputs 416, AM/FM antenna 418, video output 420, microphone jack 312 that may be optionally connected to a microphone 422, subwoofer speaker 424, front left speaker 426, front right speaker 428, center speaker 430, rear left speaker 432, and rear right speaker 434.

The DSP 414 is able to accesses the audio content (i.e. audio data stream or audio data in memory) and generates audio signals from the audio content. In the current example implementation, the processor 402 and DSP 414 are shown as being separate, but in other implementations the processor 402 and DSP 414 may be combined into a single processor or a single DSP. The DSP 414 may also implement an AM/FM receiver in the current example implementation, but in other implementations the AM/FM receiver may be separate from the DSP 414. The memory 408 is depicted as a single memory, but in practice the memory may be divided between different types of memory located in more than one location within the AVR 302. Examples of such memory may be removable SD random access memory (RAM), RAM located within the DSP, RAM located within the processor, display buffers associated with display 308.

Figure 5:
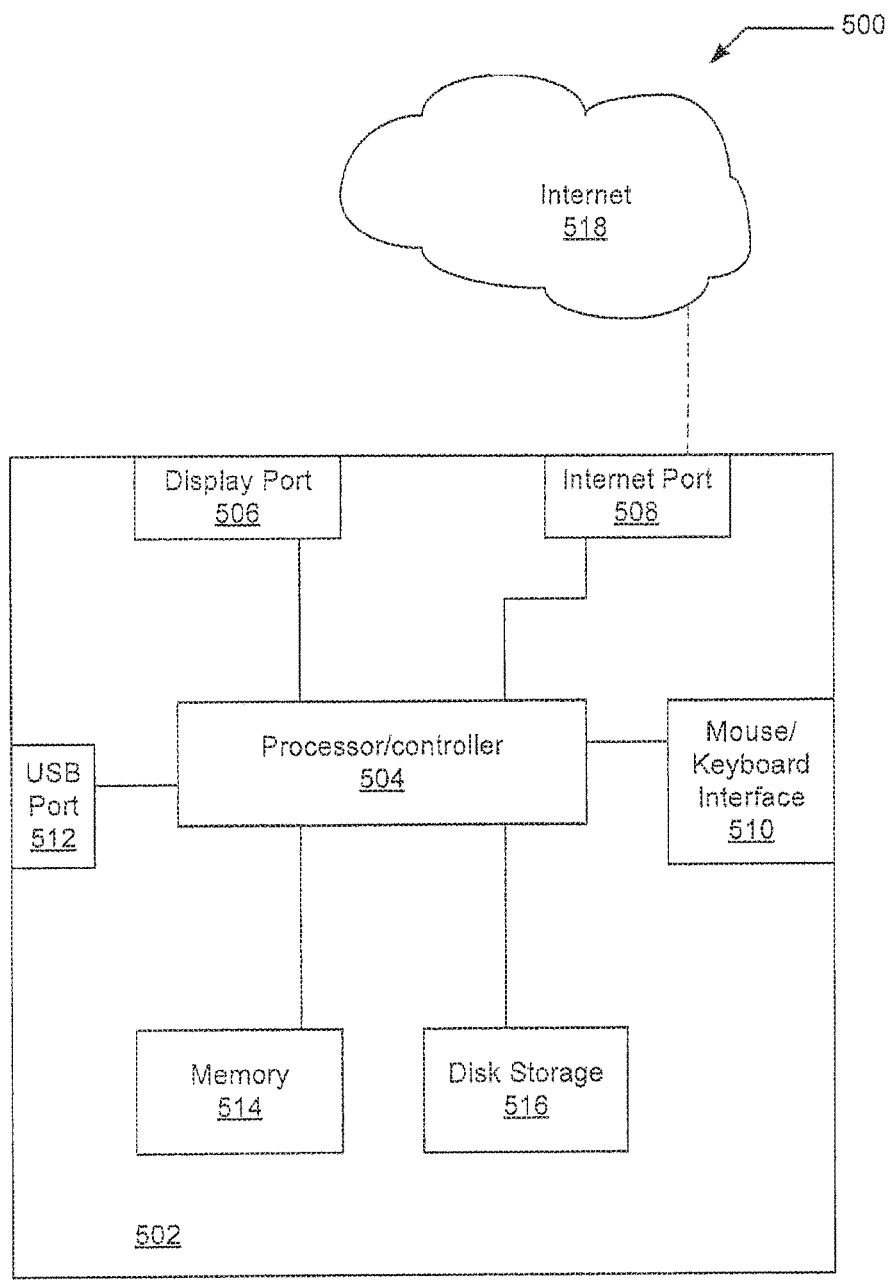
FIG. 5 is a block diagram of a cloud access server (CAS) in accordance with one example of an implementation of the invention.

Turning to FIG. 5, FIG. 5 is a block diagram 500 of a cloud access server (CAS) 502 in accordance with one example of an implementation of the invention. The CAS 502 may have a controller 504 (i.e. microprocessor, RISC processor, DSP, or other digital type processor). The controller 504 may be coupled to display port 506, internet port (communication port) 508, mouse/keyboard interface 510, USB ports 512, memory 514, disk storage 516. The CAS 502 may be executing a LINUX operating system and associated programs to operate as a server. In other implementation, a windows or other type server operating system may be used to provide the base server functionality for accessing disk, hardware, and network resources in addition to providing network connectivity to the internet and/or cloud network 518.

Figure 6:
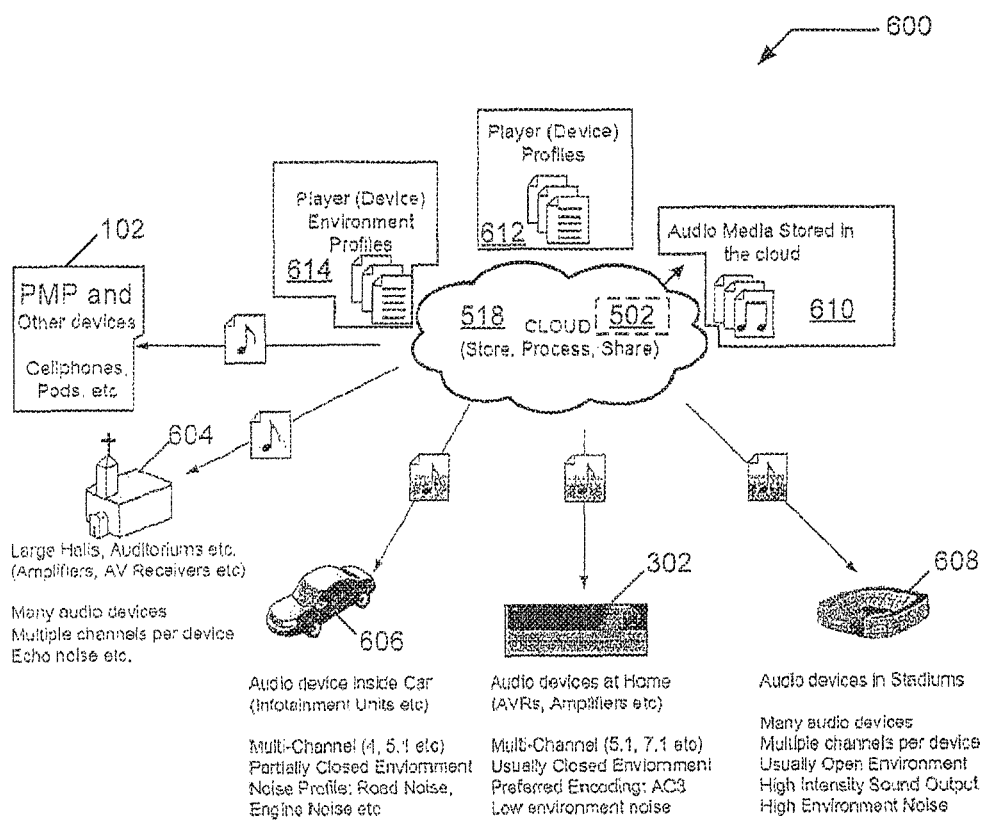
FIG. 6 is a diagram of one example of an implementation of a cloud network with a PMP of FIG. 1, AVR of FIG. 3, and CAS of FIG. 5.

In FIG. 6, FIG. 6 is a diagram 600 of one example of an implementation of a cloud network 518 with a PMP 102 of FIG. 1, AVR 302 of FIG. 3, and CAS 502 of FIG. 5. The different types of audio devices, such as PMP 102, sound equipment in large halls/auditoriums 604, audio devices inside vehicles 606, AVR 302, sound equipment in stadiums 608, may access the cloud network 518 and retrieve audio content 610, player/device profiles 612, and environment profiles 614. Within the cloud network 518, there are a multiple CAS 502 that assists in locating and providing the information to the requesting audio devices.

When PMP 102 being played in a carpeted room requests audio content from CAS 502, the CAS 502 accesses the network and locates a player/device environment profile 614 based upon the location or location type (carpeted living room, pool area, etc. . . . ), player profile associated with the hardware, and requested audio content 610. The CAS then processes the audio content prior to downloading, or if streaming dynamically in response to the accessed profiles in order to deliver the content that is in an optimal format for the audio device and processed for the environment and audio device (in this case a PMP 102).

Turning to FIG. 7, FIG. 7 is one example of a table 700 of characteristics that may be contained in a device profile 612 received at the CAS 502 of FIG. 5 from a PMP 102 of FIG. 1 or AVR 302 of FIG. 3. The device profile may have multiple attributes 702 or parameters that may have different usage or impact depending upon the audio device. The first attribute or parameter is "number of audio channels" 704 that represents the number of audible channels or speakers available on the device. For a PMP it may be the number of channels of the headset if speakers are unavailable (traditionally 2 channel). Examples of the number of channels are 2, 2.1, 2.2, 5.1, and 7.1 where the point one or two refers to subwoofer channel(s). The original audio content is processed according to this attribute to meet the channel requirements of the device in the cloud network, preferably at the CAS 502. For example if the profiled device supports 2 channels (such as a PMP) and the source audio content is encoded for 5.1 channels, the source audio content is downgraded so 2-channel audio content is transmitted from the cloud network to the device.

Another attribute that may be present in a device profile 612 is "preferred audio encoding" attribute or parameter 706. A device, such as a PMP 102 or AVR 302 may have a preferred raw digital audio file such as uncompressed PCM data or compressed encoding like MP3, WMA etc. . . . Thus, if a player supports only MP3 encoding and the original audio content is encoded as raw PCM, then a CAS 502 in the cloud network 518 transcodes the original audio content into MP3 audio content for transmission to the device, such as a PMP 102. It is noted that the actual conversion of audio content, form one type of encoding to another is well known in the art with many transcoders available for numerous operating systems.

Yet another attribute that may be present in the device profile 702 is a "bandwidth available" attribute or parameter 708. The bandwidth available for connecting to the cloud network 518 is associated with this parameter. A wireless network or hardware limitations may affect the bandwidth available for transmission of the audio content. Upon processing this parameter, a CAS 502 in the cloud network is able to adjust the transmission rate of the audio content to the audio device.

An additional attribute that may be present in the device profile 702 is an "internal memory" attribute or parameter 710. The "internal memory" attribute or parameter 710 identifies the amount of storage space available on the device for storing audio content. If there is not enough space for the audio content to be downloaded from a CAS 502 in the cloud network 518, the CAS 502 may send a message that results in an error message being displayed, such as display 104 of PMP 102. In other implementations, the "internal memory" attribute or parameter 710 may identify the amount of memory present on a device, such as PMP 102 and avoid downloading audio content that is larger than that amount.

The device profile 702 may exist on a server in a database within the cloud network 518 that is accessed by the CAS 502. The file may be generated for a type of audio device, such as all SANSA E200 PMPs and accessed by an "equipment identifier" attribute or parameter 712. In other implementations, a unique device identifier may be associated with the type of audio device in place of or in addition to the equipment identifier that contains data associated with a specific device. The specific device data may be periodically updated by a user using a web browser accessing a CAS 502 that updates a device profile record that would preferably be stored in a database distributed in the cloud network 518. In yet other implementations, the device profile may be located on the actual audio device and transmitted with a request for audio content to a CAS 502 residing in the cloud network 518 containing a unique device identifier 714 attribute or parameter. The attributes and parameters associate with an actual audio device derived in real-time allows for the exact amount of available memory to be determined.

In FIG. 8, FIG. 8 is one example of a table 800 of characteristics of environment attributes 802 that may be received at CAS 502 of FIG. 5. The environment attributes 802 are used to identify the type of environment that the audio device is being used. The "operating environment" attribute or parameter 804 may indicate the type of room or surroundings that the audio device is present in, such as large hall, concert hall, stadium, car, on the move etc. . . . . The different environments typically have different acoustic characteristics. By knowing the operating environment, the audio content may be "tuned" at the CAS 502 in the cloud network 518. It is noted that in other implementations, additional servers dedicated to tuning and/or transcoding original audio content may be present in the cloud network 518 and have similar hardware and operating systems as the CAS 502 and further distribute processing in the cloud network. Such "tuning" may consist of applying predetermined sound field filters to the original audio content. In other implementations, where precise operating environment information is known, filters may be generated dynamically or be generated and recalled that are associated with an audio device (such as AVR 302) and applied to the original audio content. In such an implementation, AVR 302 would use prerecorded audio signals that are recorded via one or more microphones (or recordings with the microphone in different locations) that are sent to a CAS 502 in the cloud network 518. The CAS 502 then causes the recording to be processed and filters for the AVR 302 to be generated and stored. The filters may then be accessed by a unique operating environment attribute or parameter 806. Other audio devices may also generate such recordings for cloud processing for optimal filter sets.

Another environment attribute 802 may be a "noise profile" attribute or parameter 808. The noise profile attribute or parameter 808 identifies the noise characteristics of the location of the audio device. For example, large halls may have echoes, stadiums are open environments and spectators are the biggest source of noise. In a vehicle, the engine and road/water/air are the greatest source of noise. The original audio content may be tailored to cancel the effects of the noise based on the noise characteristics stored or noise samples dynamically uploaded to a cloud server in the cloud network as described with previous attributes and parameters.

Figure 9:
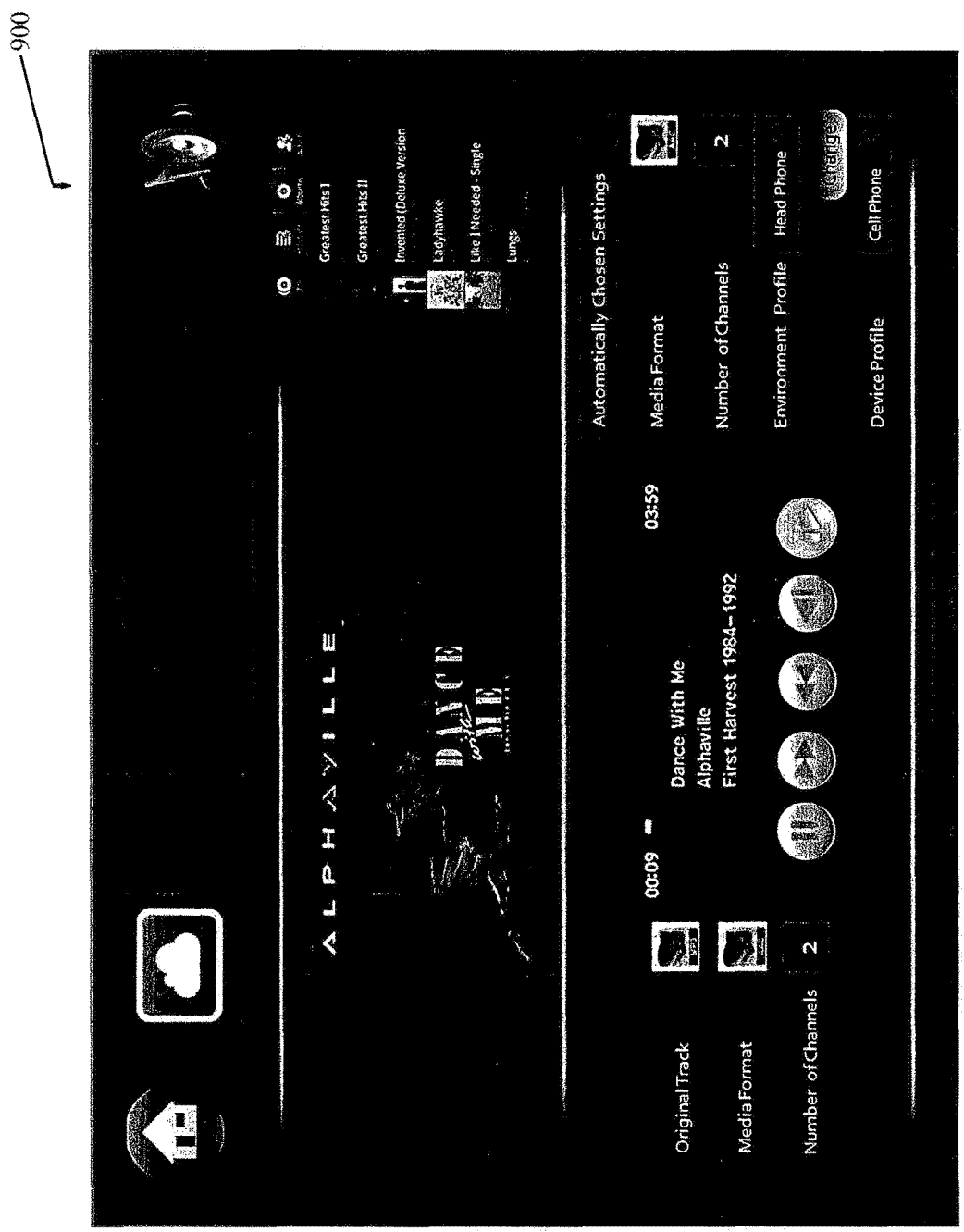
FIG. 9 is a diagram of a user interface that may generate the device profile and environment profile in accordance with one example of an implementation of the invention.

Turning to FIG. 9, FIG. 9 is a diagram of a user interface 900 that may generate the device profile 702 and environment profile 802 in accordance with one example of an implementation of the invention. The user interface 900 may be displayed on a PMP 102 and enable the user to select and/or set the different attributes and parameters.

Figure 10:
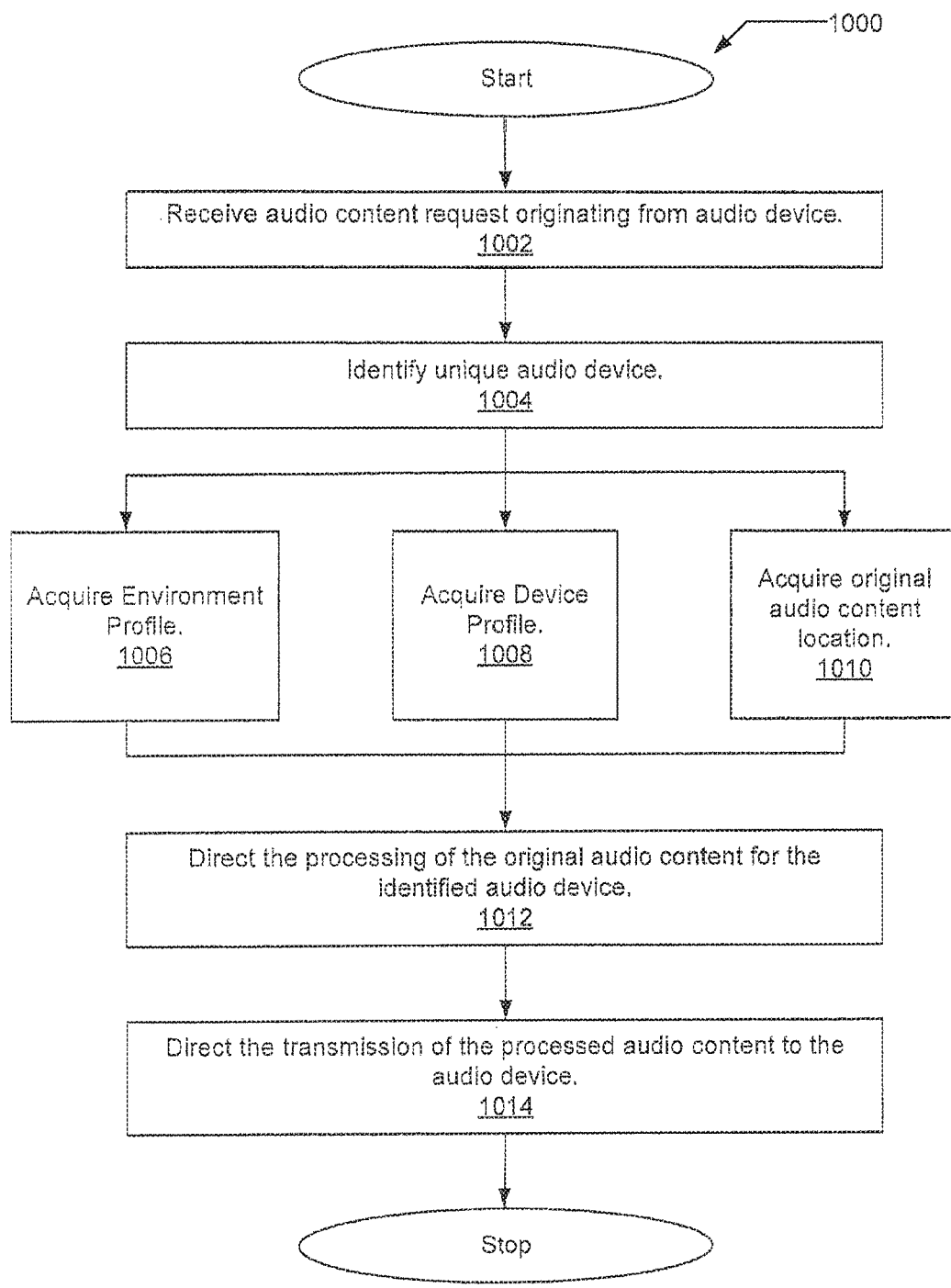
FIG. 10 is a flow diagram of one example of an implementation of the cloud based audio rendering approach implemented on the CAS of FIG. 5.

FIG. 10 is a flow diagram 1000 of one example of an implementation of the cloud based audio rendering approach implemented on the CAS 502 of FIG. 5. The approach starts by receiving an audio content request that originated from the audio device 1002, such as a PMP 102 or AVR 302 at the CAS 502. Being a cloud network 518 implementation, it is possible for the request to be passed among servers before reaching CAS 502 because of distributed processing in the cloud implementation. The CAS 502 access a unique identification that may be contained in the request associated with the audio device 1004. The CAS 502 then acquires an environment profile 702 at 1006, device profile 802 at 1008 and original audio content location at 1010. The profiles and content may be located locally on the server or more preferably disturbed on servers and databases located within the cloud network 518. The acquiring steps are shown as occurring in parallel, but in practice the steps may occur in series or a combination of series and parallel.

Upon the profiles and content being acquired, the CAS 502 directs the processing of the original audio data for the identified device and environment 1012. The processing may involve transcoding of the file format and encoding for more or less speakers (converting from a first audio encoding format to a second audio encoding format). The processing may also include to the audio content. The application of filters may occur before or after the transcoding of the audio data. The CAS 502 may process the audio content directly or in other implementations, it may occur at a server located elsewhere in the cloud network, such as where the original audio content is located. The CAS 502 then directs the downloading of the processed audio content 1014. The processed audio content may reside on the CAS 502 or in other implementations may reside on a server located in the cloud network 518 that is directed to download (or stream) the processed audio content to the audio device.

Figure 11:
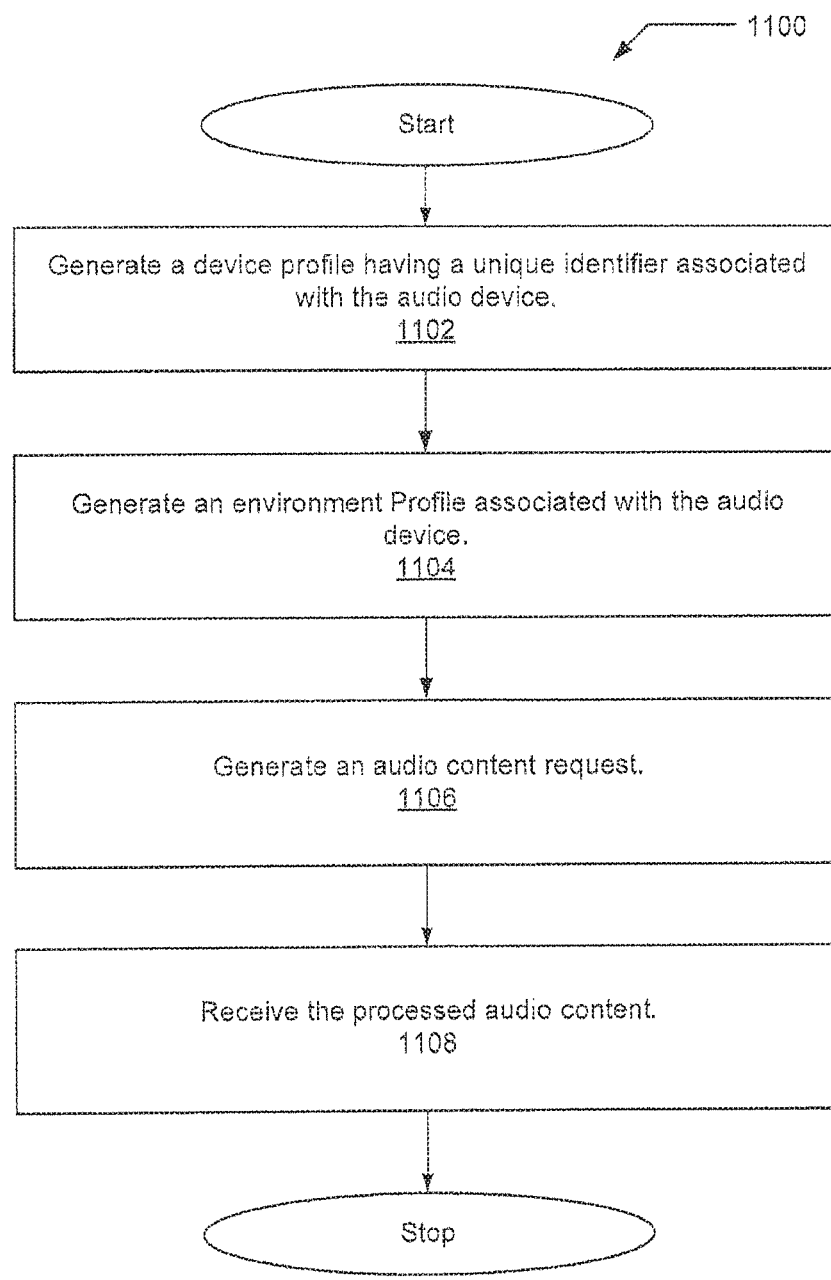
FIG. 11 is a flow diagram of one example of an implementation of the cloud based audio rendering approach implemented on an audio device, such as PMP of FIG. 1 and AVR of FIG. 3.

Turning to FIG. 11, FIG. 11 is a flow diagram 1100 of one example of an implementation of the cloud based audio rendering approach implemented on an audio device, such as PMP 102 of FIG. 1 and AVR 302 of FIG. 3. An audio device, such as AVR 302 generates a device profile 702 having a unique identification associated with the audio device 1102. In the current implementation, the AVR 302 may generate the device profile 702 by accessing a previously stored device profile 702 that may be stored in memory 408. An environmental profile 802 may be generated that is associated with the audio device 1104. In other implementations, the device profile and environmental profile may reside in one or more databases disturbed in a cloud network 518 by generating only an audio content request 1106 having a unique device identifier that is sent with an audio content identifier (such as song title, album, and/or artist). An audio content request is then transmitted to server, such as CAS 502 residing in the cloud network 518. In response to the audio content request 1106, the audio device receives processed audio content 1108.

It will be understood, and is appreciated by persons skilled in the art, that one or more processes, sub-processes, or process steps described in connection with FIGS. 10 and 11 may be performed by hardware and/or software (machine readable instructions). If a server is described, the term "server" may mean a combination of hardware and software operating together as a dedicated server or it may mean software executed on a server to implement the approach previously described. If the process is performed by software, the software may reside in software memory (not shown) in a suitable electronic processing component or system such as one or more of the functional components or modules schematically depicted in the figures.

The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer readable medium may selectively be, for example, but is not limited to, an electronic, magnetic, optical, electromagnetic, infrared, or semiconductor system, apparatus or device. More specific examples, but nonetheless a non-exhaustive list, of tangible computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper (punch cards or punch tape) or another suitable medium upon which the instructions may be electronically captured, then compiled, interpreted or otherwise processed in a suitable manner if necessary, and stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A cloud access server for audio rendering accessed by an audio device, comprising:
    a communication port configured to receive an audio content request from an audio device; and
    a processor coupled to a communication port, the processor being configured to:
    receive the audio content request from the communication port;
    identify original audio content in response to the audio content request, where the audio content request has associated with an environmental profile and a device profile having a unique device identifier that identifies the audio device;
    acquire a location of the original audio content that corresponds to the audio content request;
    direct the processing of the original audio content into processed audio content in response to attributes contained in both the device profile and the environment profile; and direct the transmission of the processed audio content to the audio device that originated the audio content request.

2. The cloud access server of claim 1, where the audio content request carries the device profile.

3. The cloud access server of claim 1, where the audio content request has an environment profile.

4. A method for audio rendering, comprising:
receiving an audio content request that originated from an audio device;
identifying a unique device identifier that identifies the audio device in response to the audio content request;
acquiring an environment profile associated with the audio device;
acquiring a device profile associated with the audio device; acquiring a location of an original audio content that corresponds to the audio content request;
directing the processing of the original audio content into processed audio content based upon both the device profile and environment profile; and
directing the transmission of the processed audio content to the audio device.

5. The method for audio rendering of claim 4 where identifying the unique device identifier occurs when the device profile is acquired, where the audio content request includes the device profile.

6. The method for audio rendering of claim 4, where the unique device identifier identifies a type of audio device and the audio device that sends the audio content request.

7. A tangible computer-readable media containing machine readable instructions for a cloud access server, comprising instructions for the steps of:
receiving an audio content request that originated from an audio device;
identifying a unique device identifier that identifies the audio device in response to the audio content request;
acquiring an environment profile associated with the audio device in response to the audio content request;
acquiring a device profile associated with the audio device based on the audio content request;
acquiring a location of original audio content that corresponds to the audio content request;
directing the processing of the original audio content into processed audio content based upon both the device profile and environment profile; and
directing the transmission of the processed audio content to the audio device.

8. The tangible computer-readable media containing machine readable instructions for a cloud access server of claim 7, where identifying the unique device identifier occurs when the device profile is acquired, where the audio content request includes the device profile.

9. The tangible computer-readable media containing machine readable instructions for a cloud access server of claim 7, where the unique device identifier identifies a type of audio device and the audio device that sends the audio content request.

10. A tangible computer-readable media containing machine readable instructions for an audio device to request audio content from a network, comprising instructions for the steps of:
generating, at the audio device, a device profile having a unique identifier associated with an audio device;
generating an environment profile associated with the audio device;
generating an audio content request at the audio device;
associating the device profile and the environment profile with the audio content request;
transmitting the audio content request including the device profile and the environment profile to a server; and
receiving processed audio content in response to the audio content request.

11. The tangible computer-readable media containing machine readable instructions for the audio device of claim 10, where the unique identifier identifies a type of audio and the audio device that transmits the audio content request.

\* \* \* \* \*